(12) United States Patent
Ogura (10) Patent No.: US 8,103,794 B2
(45) Date of Patent: Jan. 24, 2012

(54) BACKUP AND RECOVERY SYSTEM AND METHOD

(75) Inventor: Kaori Ogura, Yokohama (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 921 days.

(21) Appl. No.: 10/199,049

(22) Filed: Jul. 22, 2002

(65) Prior Publication Data

US 2004/0019705 A1 Jan. 29, 2004

(51) Int. Cl.
*G06F 15/16* (2006.01)
*G06F 15/173* (2006.01)
*G06K 15/00* (2006.01)

(52) U.S. Cl. .................. 709/243; 709/253; 358/1.14

(58) Field of Classification Search .................. 709/253, 709/213–216, 201–203, 225–226, 238, 243; 358/440, 1.14, 1.15
See application file for complete search history.

(56) References Cited

U.S. PATENT DOCUMENTS

| | | | | |
|---|---|---|---|---|
| 4,652,934 A | * | 3/1987 | Muroya et al. | 382/299 |
| 5,014,300 A | * | 5/1991 | Harvath et al. | 379/100.09 |
| 5,018,191 A | * | 5/1991 | Catron et al. | 379/100.09 |
| 5,307,176 A | * | 4/1994 | Dweck et al. | 358/403 |
| 5,361,134 A | * | 11/1994 | Hu et al. | 358/296 |
| 5,717,841 A | * | 2/1998 | Farrell et al. | 358/1.15 |
| 5,754,782 A | * | 5/1998 | Masada | 709/213 |
| 5,761,284 A | * | 6/1998 | Ranalli et al. | 379/100.09 |
| 5,989,060 A | * | 11/1999 | Coile et al. | 439/489 |
| 6,009,153 A | * | 12/1999 | Houghton et al. | 379/102.02 |
| 6,367,997 B2 | * | 4/2002 | Ito | 400/582 |
| 6,373,940 B2 | * | 4/2002 | Shaffer et al. | 379/355.02 |
| 6,477,629 B1 | * | 11/2002 | Goshey et al. | 711/162 |
| 6,734,985 B1 | * | 5/2004 | Ochiai | 358/1.15 |
| 6,892,239 B1 | * | 5/2005 | Kirkeby | 709/226 |
| 6,980,312 B1 | * | 12/2005 | Czyszczewski et al. | 358/1.15 |
| 7,529,834 B1 | * | 5/2009 | Birrell et al. | 709/226 |
| 2004/0039967 A1 | * | 2/2004 | Park | 714/30 |
| 2005/0162693 A1 | * | 7/2005 | Torii | 358/1.15 |

* cited by examiner

*Primary Examiner* — Philip Chea
*Assistant Examiner* — Lashanya Nash
(74) *Attorney, Agent, or Firm* — Foley & Lardner LLP (57) ABSTRACT

In a system and method for backing up user data of a first hardcopy device in a second hardcopy device, the user data in the first hardcopy device is identified. The second hardcopy device is identified, and the user data from the first hardcopy device is copied into a storage of the second hardcopy device. The user data enables the second hardcopy device to operate in the same manner as the first hardcopy device.

25 Claims, 5 Drawing Sheets

BACKUP AND RECOVERY SYSTEM AND METHOD

FIELD OF THE INVENTION

The present invention relates generally to backing up user data, and more particularly to a system and method for backing up user data in multi-function peripherals (MFPs) and similar devices.

BACKGROUND OF THE INVENTION

In both stand-alone and network systems, a user may connect a computer, such as a personal computer (PC) or server, to one or more peripheral devices. The peripheral devices may be one or more hardcopy devices, such as a printer, a facsimile, a scanner or a photocopier. Other peripheral devices may also be attached to the computer including disk drives, CD-ROMs and other storage devices, as well as audio and video equipment.

For the hardcopy devices, it is possible to have a single device, referred to as a multi-function peripheral (MFP), perform multiple functions including printing, copying, faxing and scanning. Using an MFP provides several benefits. For example, an MFP has a small footprint for the combination of functionality. It saves cost for low-duty use by sharing toner or ink for printing, copying and faxing. An MFP also provides a single device for all document/paper-related needs, which requires less to learn if you need all the functionality provided.

Like some other hardcopy devices, the MFP stores certain information for proper operation. For example, to receive a fax, the MFP stores a fax number. Operating in a network accessible via a LAN or via the Internet, the MFP stores an address, such as an IP address. The MFP may also store custom information that is used by the user to control the operation of the MFP. For example, the MFP may store an address book used by the user to identify where to send a fax or an e-mail. The MFP may also store setting information, such as resolutions and fonts to use when printing a document or receiving a fax.

SUMMARY OF THE INVENTION

Briefly, in one aspect of the invention, a method for backing up user data of a first hardcopy device in a second hardcopy device identifies the user data in the first hardcopy device, and identifies the second hardcopy device. The user data from the first hardcopy device is copied into a storage of the second hardcopy device. The user data enables the second hardcopy device to operate in the same manner as the first hardcopy device.

In another aspect of the present invention, the user data includes a fax number for the first hardcopy device, the user data includes an IP address for the first hardcopy device.

In yet another aspect of the present invention, in the event of a failure of the first hardcopy device, a fax sent to the fax number for the first hardcopy device is received by the second hardcopy device based on the user data copied to the second hardcopy device.

In still another aspect of the present invention, in the event of a failure of the first hardcopy device, a job sent to the first hardcopy device is received by the second hardcopy device based on the user data copied to the second hardcopy device.

DETAILED DESCRIPTION OF THE PREFERRED EMBODIMENT

Figure 1:
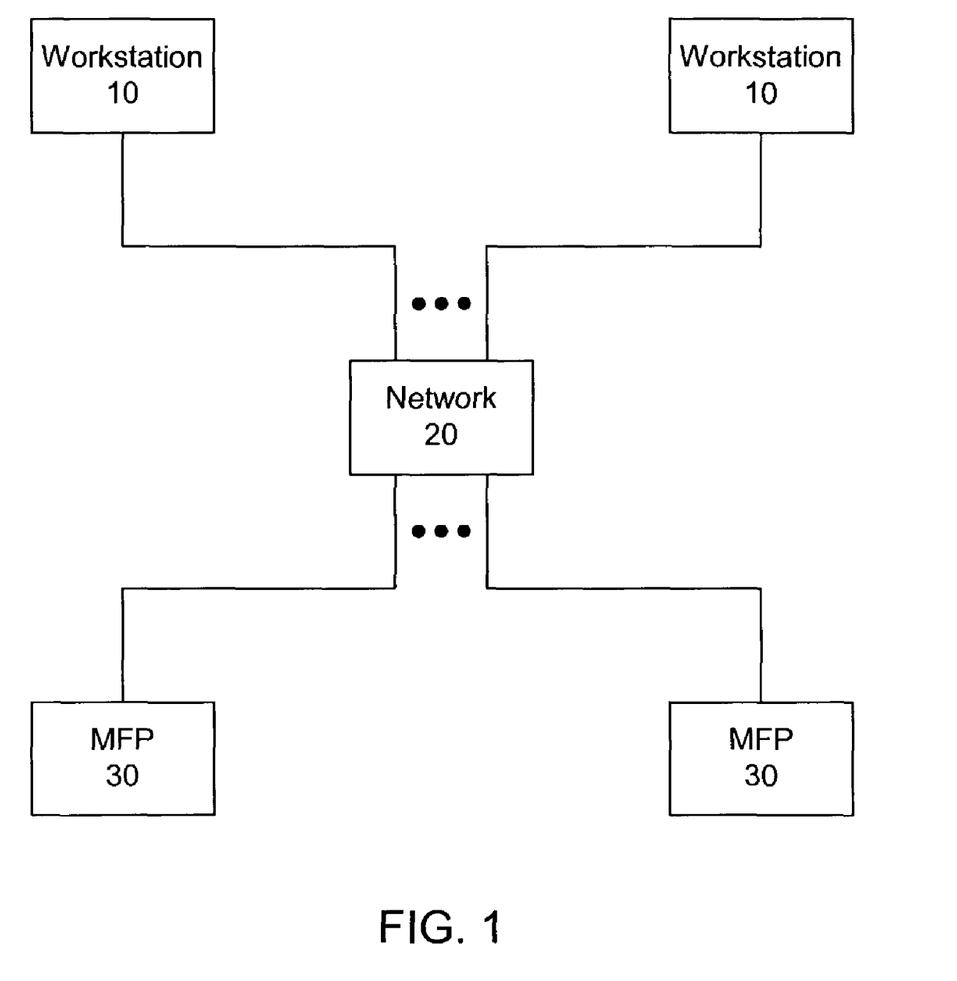
FIG. 1 is a block diagram of a communication system consistent with the present invention.

FIG. 1 is a block diagram of a communication system consistent with the present invention. As shown in FIG. 1, the communication system includes one or more workstations 10, a network 20, and one or more multi-function peripherals (MFPs) 30. Each of the workstations and each of the MFPs are coupled to the network 20. The network 20 may be implemented as a local network, such as a LAN, or as a public network, such as the Internet.

The workstation 10, which may be a PC or a server, includes a CPU, a main memory, a ROM, a storage device and a communication interface all coupled together via a bus in one embodiment consistent with the present invention. The CPU may be implemented as a single microprocessor or as multiple processors for a multi-processing system. The main memory is preferably implemented with a RAM and a smaller-sized cache. The ROM is a non-volatile storage, and may be implemented, for example, as an EPROM or NVRAM. The storage device can be a hard disk drive or any other type of non-volatile, writable storage.

The communication interface for the workstation 10 provides a two-way data communication coupling via a network link to the network 20. For example, if the communication interface is an integrated services digital network (ISDN) card or a modem, the communication interface provides a data communication connection to the corresponding type of telephone line. If the communication interface is a local area network (LAN) card, the communication interface provides a data communication connection to a compatible LAN. Wireless links are also possible. In any such implementation, the communication interface sends and receives electrical, electromagnetic or optical signals, which carry digital data streams representing different types of information, to and from the network 20.

If the network is implemented as the Internet, the workstation 10 or server can transmit a requested code for an application program through the Internet, an ISP, the local network and the communication interface. The received code can be executed by the CPU in the workstation or server as it is received, stored in the storage device, or stored in some other non-volatile storage for later execution. In this manner, a user at the workstation or server may obtain application code in the form of a carrier wave.

The MFP 30 is a device which can perform the functions of multiple devices, such as a printer, a fax machine, a copier, a plotter, a scanner or any other functional device that generates hardcopies of images or text. MFPs 30 are also known as multifunction printers. Like the workstation 10, the MFP 30 may have a CPU, a main memory, a ROM, a storage device and a communication interface all coupled together via a bus. The MFP 30 may also have a communication interface to provide a two-way data communication coupling via a network link to the network 20. The network link to the network 20 enables the MFP 30 to receive data from and to output data to the workstation 10. Instead of a network link, MFPs 30 may use a Universal Serial Bus (USB) to connect to a USB port on the workstation 10.

In operation, the workstations 10 communicate with the MFPs 30 via the network 20 or via a more direction connection, such as the USB. This communication enables the workstation 10 to request the MFP 30 to perform a function, such as print a document or send or receive a fax. In addition, the workstation 10 can request information from the MFP 30.

To communicate with the MFP 30, the workstation 10 may use a network protocol such as SNMP, which is a protocol for monitoring and managing systems and devices in a network. The functions supported by the protocol are the request and retrieval of data, the setting or writing of data, and traps that signal the occurrence of events. The data being monitored and managed is defined by a management information base (MIB). A MIB includes the specification and formal description of a set of objects and variables that can be read and possibly written using the SNMP protocol. SNMP and similar communication protocols can also be used with non-networked connections, such as USB, FireWire and IEEE 1284 (Parallel).

The MFP 30 stores certain information, collectively referred to herein as user data, in a memory device to enable the MFP 30 to operate properly and perform its various functions. In addition, the user data may be used by another or backup MFP 30 to enable the backup MFP 30 to operate and function in the same manner as the primary MFP 30, as described below. The user data includes contact information for the MFP 30. The contact information includes an address for the MFP 30, such as an IP address, that enables other devices to contact and communicate with the MFP 30. The contact information also includes a fax number used by other faxes to contact the MFP 30.

The user data also includes user information. User information corresponds to data provided by a user of the particular MFP 30. The data provided by the user may be an address book for holding fax number numbers, telephone numbers and e-mail addresses. The address book may be used by the MFP 30 to send a fax, a voice mail message or an e-mail in accordance with the selection of a user.

In addition to the contact information and the user information, the user data may include setting information. The setting information may include a resolution for which the MFP 30 prints or copies images. The setting information may also include any font information or page size to be used by the MFP 30. The setting information may be defaults settings for the MFP 30 or information set by the user.

Each MFP 30 may have one or more users that are the primary users of that MFP 30. These primary MFPs 30 store the user data for each of the one or more users. During the operation of the MFPs 30, there may be a fault or error that occurs that disables the MFP 30. If the MFP 30 fails, the primary users of that MFP 30 are unable to receive their faxes because of the inaccessibility of the contact information. In addition, because of the inaccessibility of the user information and the setting information, the primary users may be unable to print, copy, scan or fax documents in a manner desired by the user.

To enable the primary users to continue to have access to the user data and still receive information based on the user data, the user data may be stored in one or more backup MFPs 30. The backup MFPs 30 may be dedicated to being backup devices or may be the primary MFP 30 for one or more other users.

Figure 2:
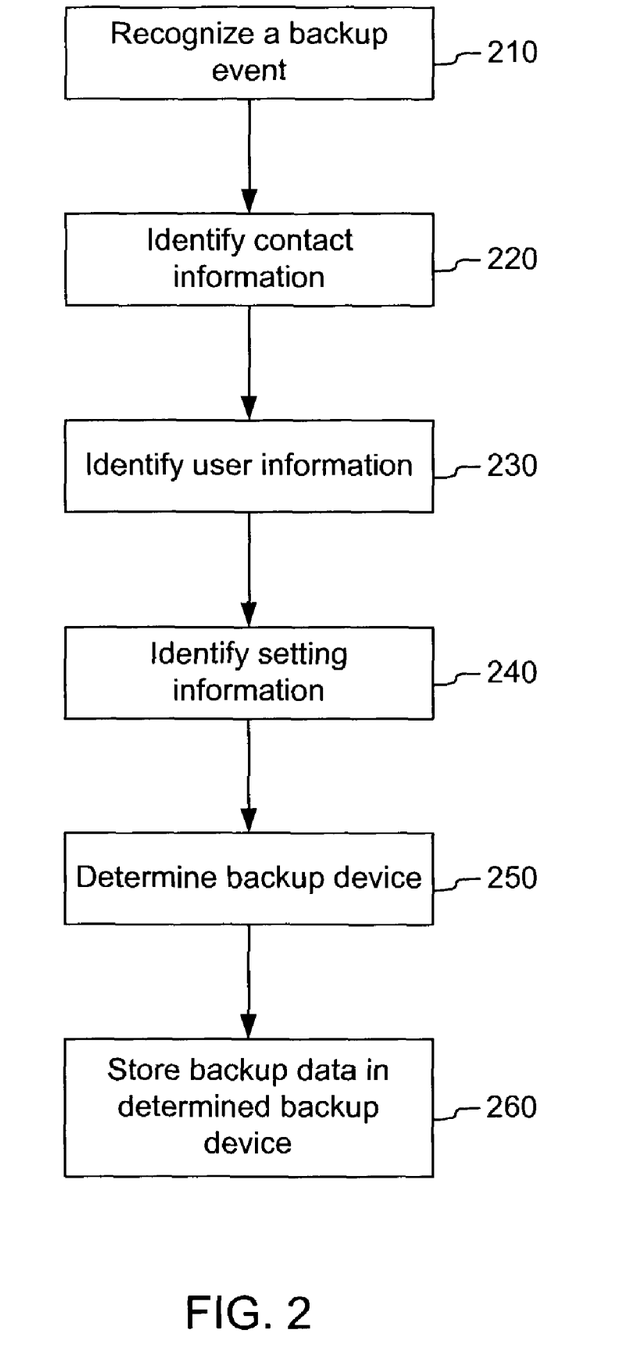
FIG. 2 is a flow diagram of a process for backing up data among devices consistent with the present invention.

FIG. 2 is a flow diagram of a process for backing up data among devices consistent with the present invention. Although the below description is made with respect to MFPs 30, it should be understood that the backup process of FIG. 2 is also applicable to any hardcopy device, such as a copier, a printer, a scanner or a fax machine, as well as combinations thereof. As shown in FIG. 2, the first step is to recognize a backup event (step 210). The backup event may be, for example, a request from a backup MFP 30 to the primary MFP 30 to send data from the primary MFP 30 to be backed up in the backup MFP 30. The backup event may occur any time the user data stored in the primary MFP 30 changes or is updated. Other backup events may be the expiration of a particular time period or some other type of trigger event.

In response to the backup event, the contact information of the device is identified (step 220). As described above, the contact information includes an address for MFP 30 or other hardcopy device, such as an IP address, that enables other devices to contact and communicate with the MFP 30. The contact information may also include a fax number used by other faxes to contact the MFP 30.

The user information is also identified (step 230). As described above, user information corresponds to data provided by a user of the particular MFP 30 or other hardcopy device. The data provided by the user may be an address book for holding fax numbers, telephone numbers and e-mail addresses. The address book may be used by the MFP 30 to send a fax, a voice mail message or an e-mail in accordance with the selection of a user.

In addition, the setting information is identified (step 240). As described above, the setting information may include a resolution for which the MFP 30 or other hardcopy device prints or copies images. The setting information may also include any font information or page size to be used by the MFP 30. The setting information may include defaults settings for the MFP 30 or information set by the user.

The collection of these information types is collectively referred to as the backup data. The backup data may include all of the types of information, i.e. the contact, user and setting information, one of the types, or some combination thereof. The backup data can include all of the user data, some subset of the user data or all of the user data in addition to other data, such as transaction information for the device. The transaction information of a device includes a history of the device, such as any error data, the time and type of any activity, such as number of pages printed, faxed or copied, when a malfunction occurred and the type of malfunction.

The device for storing the backup data is also determined (step 250). The device for storing the backup data may be a backup MFP 30, which stores backup data corresponding to a primary MFP 30. The determined backup device may be one that is selected by the user. The determined backup device may also be determined according to a priority scheme among the available backup devices or according to a level of use among the available backup devices. For example, the backup device having the lowest level of use may be selected. Alternatively, a device accessible to all of the backup devices, such as a server in the network 20, may be determined as the backup device for one or more of the primary devices or MFPs 30.

After the backup device has been determined, the backup data is stored in the determined backup device (step 260). To store the backup data in the backup device, the primary device may deliver the backup data to the backup device via the network 20 using the applicable communication protocol. The primary and backup devices may be in the same local network or LAN, or may be in different networks communicating via the Internet. The backup data is stored in a storage area or memory of the backup device, such as a disk drive or other non-volatile memory element.

Figure 3A:
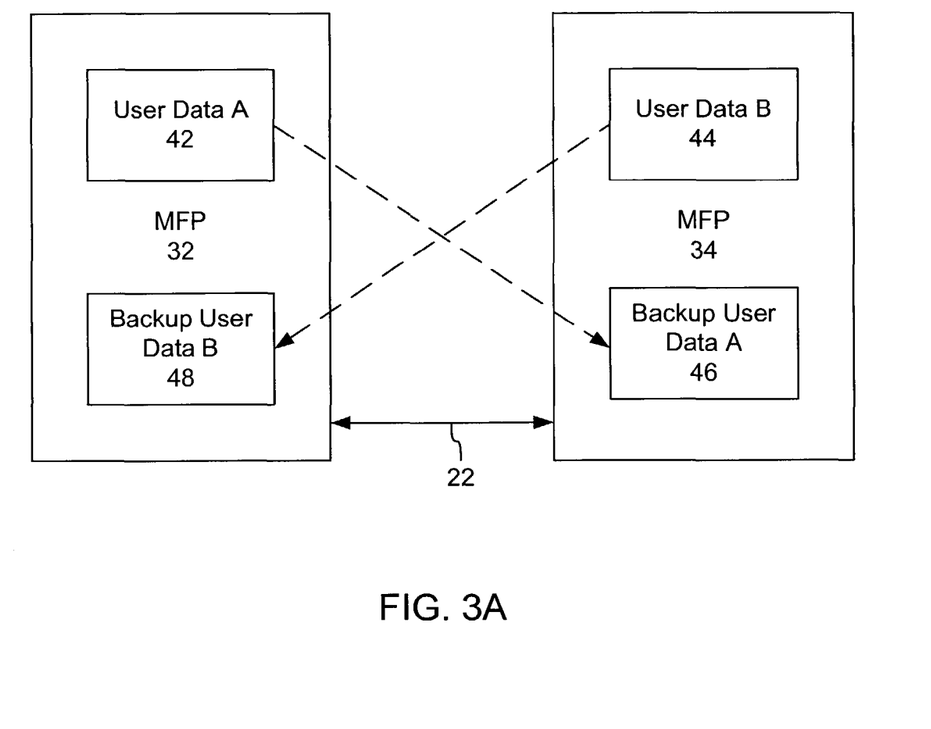
FIGS. 3A and 3B are block diagrams of devices storing user data and backup data consistent with the present invention.
Figure 3B:
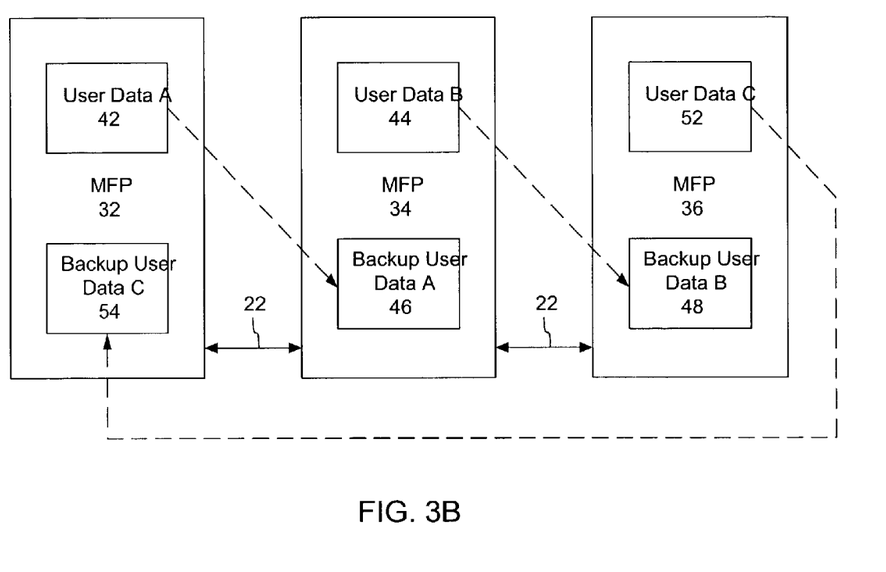

FIGS. 3A and 3B are block diagrams of devices storing user data and backup data consistent with the present invention. As shown in FIG. 3A, a system includes at least a pair of devices, MFPs 32 and 34, coupled together by a link 22. Link 22 may be a network link, such as over a LAN or over the Internet, or a more direct communication link, such as a USB, FireWire or IEEE 1284 (Parallel) connection. MFP 32 stores user data A 42, and MFP 34 stores user data B 44. In the arrangement shown in FIG. 3A, the MFPs 32 and 34 are each other's respective backup device. As a result, backup data B 48 is stored in MFP 32, and backup data A 46 is stored in MFP 34. It should be understood that the user data of more than one user may be stored in MFP 32 and MFP 34. In that case, the user data for each user of that MFP is stored in the respective backup MFP.

In FIG. 3B, a system includes at least three devices, MFPs 32, 34 and 36, coupled together by links 22. Links 22 may be implemented in the same manner as the link 22 in FIG. 3A. In the system of FIG. 3B, each MFP serves as a backup device for a corresponding one of the other MFPs. In particular, backup data C 54 is stored in MFP 32, backup data A 46 is stored in MFP 34, and backup data B 48 is stored in MFP 36.

The systems shown in FIGS. 3A and 3B are only examples of how user data may be backed up among multiple hardcopy devices or MFPs. In an alternative system, the backup data for each device may be stored in one device, such as another MFP or a server. For example, in the event of the failure of a primary device, the backup device for the failed primary device may access the user data stored in the single device, such as a server, and use the accessed user data to enable the backup device to perform in the same manner as the failed primary device. In another embodiment, the user data for a particular user may be backed up and stored in more than one backup device to provide additional redundancy.

Figure 4:
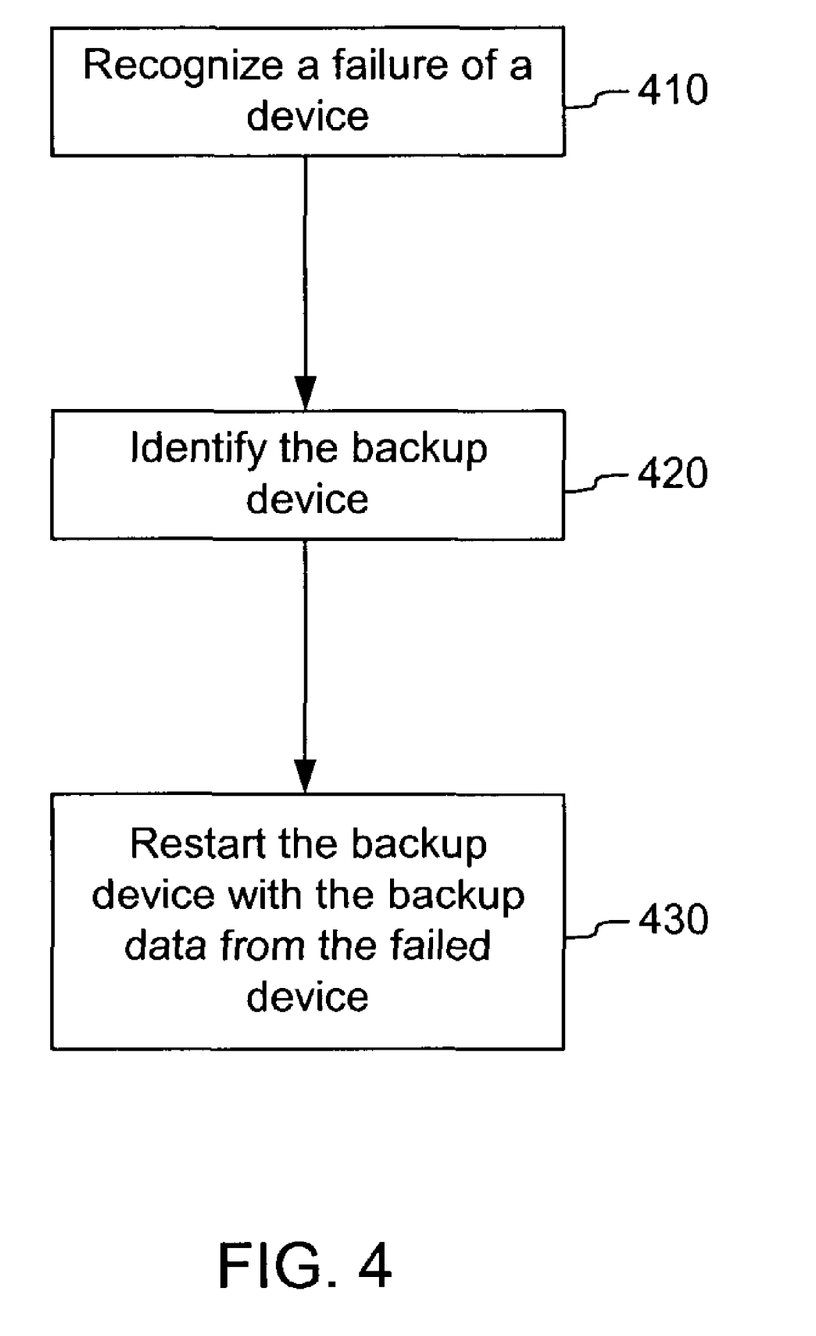
FIG. 4 is a flow diagram of a process for restarting a backup device in place of a failed device consistent with the present invention.

With a user's user data backed up in at least one backup device, the user can continue to function in the same manner even if the user's primary device fails. FIG. 4 is a flow diagram of a process for restarting a backup device in place of a failed device consistent with the present invention. As shown in FIG. 4, the first step is to recognize the failure of a device (step 410). A device, such as a hardcopy device or MFP, may fail due to a hardware or a software error. The failure may simply require the device to be rebooted or restarted. The failure may also be more severe, requiring a repair person to diagnose the failure and determine how to fix the failure.

To recognize the failure, the device that has failed can transmit a control signal indicating that there is a failure. Alternatively, such as if the failed device is incapable of sending such a control signal, one or more devices may monitor the other devices to determine when a device has failed. For example, a backup device backing up a primary device may recognize the failure of the primary device when it fails to receive backup data in response to a backup event. In another example, a single device, such as a server, may monitor each of the devices and determine if a device has failed based on that monitoring.

When it has been determined that a device has failed, a backup device is identified (step 420). The backup device corresponds to the one or more devices holding the backup data for the failed primary device. The backup device may be identified according to the manner in which the failure of a primary device was recognized. For example, if the backup device recognized the failure of the primary device, the backup device would be able to identify itself as the applicable backup device. The backup device may also identify itself as the applicable backup device if it receives the control signal indicating that the primary device has failed. If a central device, such as a server, monitors and recognizes the failed device, the central device may store data, such as in a table, which identifies the one or more backup devices for the failed device.

If there is more than one backup device for a failed primary device, there are several options to identify the applicable backup device. Any of the users of the failed primary device may identify the applicable backup device. Alternatively, the applicable backup device may be identified according to a priority scheme among the backup devices or according to the level of use among the backup devices. For example, the applicable backup device may be identified as the one with the lowest level of use.

The identified backup device is then restarted with the backup data from the failed device (step 430). As described above, the backup data may include contact information for the failed device, as well as user information and setting information. Restarting the backup device with the backup data enables the backup device to perform the functions of the failed primary device in the same manner as the primary device when properly operating based on the information in the backup data. For example, if the failed device is a fax machine or an MFP with fax capabilities, the restarted backup device would be capable of receiving faxes intended for the failed primary device. If the backup data included an address book for a user, the user could scan a document at the backup device and send it by fax or e-mail to an intended recipient using the fax or e-mail information at the restarted backup device.

The applicable backup device may be restarted automatically after the failure of the corresponding primary device. For example, as described above, the backup device may itself recognize the failure of the primary device or receive a control signal indicating the failure of the primary device, and restart itself in response to this recognition or control signal. Alternatively, the applicable backup device may be restarted manually by a user. It is also possible that the applicable backup device can perform the functions of the failed primary device in the same manner as the properly operating primary device without being restarted by referencing the backup data in response to the recognition of the failure of the corresponding primary device.

Depending upon the severity of the failure of the primary device, certain information in the failed device may be inaccessible to the person repairing it. This information may include the user data stored at the primary device, as well as the transaction information described above. To assist the person repairing the primary device, the person may access this information from the associated backup device. The associated backup device can store all of the user data of the primary device. The associated backup device can also store the transaction information, which can be particularly helpful to the repair person when trying to diagnose the failure of the primary device. Moreover, once the failed primary device has been repaired, the user data and transaction information stored in the backup device can be restored to the primary device.

The foregoing description of a preferred embodiment of the invention has been presented for purposes of illustration and description. It is not intended to be exhaustive or to limit the invention to the precise form disclosed, and modifications and variations are possible in light in the above teachings or may be acquired from practice of the invention. The embodiment was chosen and described in order to explain the principles of the invention and as practical application to enable one skilled in the art to utilize the invention in various embodiments and with various modifications are suited to the particular use contemplated. It is intended that the scope of the invention be defined by the claims appended hereto and their equivalents.

What is claimed is:

1. A method for backing up user data comprising:
receiving a request from a first hardcopy device for backup to a second hardcopy device selected by a user among other hardcopy devices and a request from the second hardcopy device for backup to the first hardcopy device selected by the user among other hardcopy devices, the first hardcopy device being coupled with the second hardcopy device via a network;
identifying a first user data in the first hardcopy device and a second user data in the second hardcopy device via the network;
identifying the first and second hardcopy device via the network;
copying the first user data from the first hardcopy device into a second storage internal to the second hardcopy device via the network and copying the second user data from the second hardcopy device into a first storage of the first hardcopy device via the network,
identifying the first user data is updated;
identifying the second hardcopy device; and
copying the updated first user data from the first hardcopy device into the second storage of the second hardcopy device via the network,
the first user data including a first IP address for the first hardcopy device and the second user data including a second IP address for the second hardcopy device,
in the event of a failure of the first hardcopy device, a job sent to the first hardcopy device is received by the second hardcopy device based on the first user data copied to the second hardcopy device and in the event of a failure of the second hardcopy device, a job sent to the second hardcopy device is received by the first hardcopy device based on the second user data copied to the first hardcopy device.

2. A method according to claim 1, the first and second hardcopy devices are each a multi-function peripheral.

3. A method according to claim 1, the job being one of a print, a copy job, or a scan job.

4. A method according to claim 1, the first user data including a first address book for at least one user of the first hardcopy device and the second user data including a second address book for at least one user of the second hardcopy device.

5. A method according to claim 4, the first address book including one or more fax numbers and one or more e-mail addresses used by the at least one user of the first hardcopy device and the second address book including one or more fax numbers and one or more e-mail addresses used by the at least one user of the second hardcopy device.

6. A method according to claim 1, the copying of the first user data including copying the user data each time the user data for the first hardcopy device changes and the copying of the second user data including copying the user data each time the user data for the second hardcopy device changes.

7. A method according to claim 1, further comprising sending a first control signal from the first hardcopy device to the second hardcopy device in response to a failure of the first hardcopy device and sending a second control signal from the second hardcopy device to the first hardcopy device in response to a failure of the second hardcopy device.

8. A method for backing up user data comprising:
receiving a request from a hardcopy device for backup to a second hardcopy device selected by a user among other hardcopy devices and a request from the second hardcopy device for backup to the first hardcopy device selected by the user among other hardcopy devices, the first hardcopy device being coupled with the second hardcopy device via a network;
receiving, at the second hardcopy device via the network, first user data of the first hardcopy device;
receiving, at the first hardcopy device via the network, second user data of the second hardcopy device;
storing the received first user data into a second storage internal to the second hardcopy device;
storing the received second user data into a first storage internal to the first hardcopy device;
restarting the second hardcopy device based on the first user data of the first hardcopy device;
restarting the first hardcopy device based on the second user data of the second hardcopy device;
copying updated first user data from the first hardcopy device into the second storage of the second hardcopy device via the network,
the first user data including a first IP address for the first hardcopy device and the second user data including a second IP address for the second hardcopy device,
in the event of a failure of the first hardcopy device, receiving a job sent to the first hardcopy device at the second hardcopy device based on the first user data copied to the second hardcopy device and in the event of a failure of the second hardcopy device, receiving a job sent to the second hardcopy device at the first hardcopy device based on the second user data copied to the first hardcopy device.

9. A method according to claim 8, the first and second hardcopy devices are each a multi-function peripheral.

10. A method according to claim 8, the job being one of a print job, a copy job, and a scan job.

11. A method according to claim 8, the first user data including a first address book for at least one user of the first hardcopy device and the second user data including a second address book for at least one user of the second hardcopy device.

12. A method according to claim 11, the first address book including one or more fax numbers and one or more e-mail addresses used by the at least one user of the first hardcopy device and the second address book including one or more fax numbers and one or more e-mail addresses used by the at least one user of the second hardcopy device.

13. A method according to claim 8, the receiving of the first user data including receiving the first user data each time the first user data for the first hardcopy device changes and the receiving of the second user data including receiving the second user data each time the second user data for the second hardcopy device changes.

14. A method according to claim 8, further comprising receiving a first control signal from the first hardcopy device at the second hardcopy device in response to a failure of the first hardcopy device and receiving a second control signal from the second hardcopy device at the first hardcopy device in response to a failure of the second hardcopy device,
the second hardcopy device is restarted in response to the reception of the first control signal and the first hardcopy device is restarted in response to the reception of the second control signal.

15. A method according to claim 8, further comprising receiving first transaction information from the first hardcopy device at the second hardcopy device and second transaction information from the second hardcopy device at the first hardcopy device.

16. A method according to claim 15, the second hardcopy device is restarted if no transaction information is received from the first hardcopy device for a predetermined period of time and the first hardcopy device is restarted if no transaction information is received from the second hardcopy device for a predetermined period of time.

17. A backup system including a first hardcopy device and a second hardcopy device coupled with the first hardcopy device via a network, comprising:
   a processor in the second hardcopy device;
   a memory in the second hardcopy device, coupled to the processor, comprising a plurality of instructions executed by the processor, the plurality of instructions configured to:
      receive a request from the first hardcopy device for backup to the second hardcopy device selected by a user among other hardcopy devices via the network;
      receive first user data from the first hardcopy device via the network;
      store the received first user data into a second storage internal to the second hardcopy device;
      restart the second hardcopy device based on the first user data of the first hardcopy device;
      copying updated first user data from the first hardcopy device into the second storage of the second hardcopy device via the network,
   a processor in the first hardcopy device;
   a memory in the first hardcopy device, coupled to the processor, comprising a plurality of instructions executed by the processor, the plurality of instructions configured to:
      receive a request from the second hardcopy device for backup to the first hardcopy device selected by the user among other hardcopy devices via the network;
      receive second user data from the second hardcopy device via the network;
      store the received second user data into a first storage internal to the first hardcopy device;
      restart the first hardcopy device based on second user data of the second hardcopy device,
   the first user data including a first IP address for the first hardcopy device and the second user data including a second IP address for the second hardcopy device,
   the memory in the second hardcopy device further comprising an instruction configured to receive a job sent to the first hardcopy device at the second hardcopy device based on the first user data copied to the second hardcopy device in the event of a failure of the first hardcopy device and the memory in the first hardcopy device further comprising an instruction configured to receive a job sent to the second hardcopy device at the first hardcopy device based on the second user data copied to the first hardcopy device in the event of a failure of the second hardcopy device.

18. A backup system according to claim 17, the first and second hardcopy devices are each a multi-function peripheral.

19. A backup system according to claim 17, the job being one of a print job, a copy job, or a scan job.

20. A backup system according to claim 17, the first user data including a first address book for at least one user of the first hardcopy device and the second user data including a second address book for at least one user of the second hardcopy device.

21. A backup system according to claim 20, the first address book including one or more fax numbers and one or more e-mail addresses used by the at least one user of the first hardcopy device and the second address book including one or more fax numbers and one or more e-mail addresses used by the at least one user of the second hardcopy device.

22. A backup system according to claim 17, the memory in the second hardcopy device further comprising an instruction configured to receive the first user data each time the first user data for the first hardcopy device changes and the memory in the first hardcopy device further comprising an instruction configured to receive the second user data each time the second user data for the second hardcopy device changes.

23. A backup system according to claim 17, the memory in the second hardcopy device further comprising an instruction configured to receive a first control signal from the first hardcopy device at the second hardcopy device in response to a failure of the first hardcopy device,
   the first hardcopy is restarted in response to the reception of the first control signal and the memory in the first hardcopy device further comprising an instruction configured to receive a second control signal from the second hardcopy device at the first hardcopy device in response to a failure of the second hardcopy device, the second hardcopy device is restarted in response to the reception of the second control signal.

24. A backup system according to claim 17, the memory in the second hardcopy device further comprising an instruction configured to receive transaction information from the first hardcopy device at the second hardcopy device and the memory in the first hardcopy device further comprising an instruction configured to receive transaction information from the second hardcopy device at the first hardcopy device.

25. A backup system according to claim 24, the second hardcopy device is restarted if no transaction information is received from the first hardcopy device for a predetermined period of time and the first hardcopy device is restarted if no transaction information is received from the second hardcopy device for a predetermined period of time.

* * * * *